United States Patent Office 3,082,180
Patented Mar. 19, 1963

3,082,180
MODIFIED MELAMINE-FORMALDEHYDE RESIN FOR DECORATIVE LAMINATING AND PROCESS FOR PREPARING SAME
Leslie Boldizar, Wallingford, and Lewis C. Pounds, Cheshire, Conn., assignors to American Cyanamid Company, New York, N.Y., a corporation of Maine
No Drawing. Filed Oct. 4, 1960, Ser. No. 60,322
9 Claims. (Cl. 260—17.3)

This invention relates to novel, modified aminoplast resinous compositions, to products prepared therefrom, and to methods of producing such compositions and products. More particularly, this invention relates to novel, modified aminoplast resinous compositions possessing properties which render them particularly useful in the preparation of decorative laminates.

The aminoplast resinous compositions which are modified in accordance with our inventioin are resinous reaction products of ingredients comprising an aldehyde, e.g., formaldehyde and an aminotriazine containing at least 2 amidogen groups, each having at least one aldehyde-reactable hydrogen atom attached to the amidogen nitrogen atom, e.g., melamine. We have found that modification of this resinous reaction product in the manner more fully described hereinbelow produces improved aminoplast resinous compositions which, when used in laminating assemblies, result in final products having improved postforming characteristics together with surface areas exhibiting a high degree of heat and chemical resistance.

The end use to which the novel, modified aminoplast resinous compositions of this invention are principally directed involves the preparation of decorative, resin-bonded multilayer structures commonly referred to as laminates, and more specifically high pressure laminates, wherein a thermosetting aminoplast condensate is employed to impregnate the decorative portions thereof. Such structures are exemplified by those laminated articles intended to be used as horizontal or working surfaces, e.g., table, counter and bar tops. Additionally, such structures are oftentimes employed as wall coverings, facings for kitchen cabinet assemblies and the like.

In laminated articles of the type involved herein, the core is conventionally composed of a plurality of kraft paper plies which have been impregnated with a phenolic resin, e.g., a resin obtained by reacting a phenolic substance such as phenol itself; substituted phenols, e.g., the alkyl phenols, such as the cresols, the xylenols, the tertiary alkyl phenols; and the like, with an aldehyde such as formaldehyde, acetaldehyde, propionaldehyde, benzaldehyde, furfural, etc.; with mixtures thereof, or with mixtures of one or more of such aldehydes and substances such as urea, thiourea, substituted ureas and thioureas, aminotriazines, such as melamine; and the like, which exists infused throughout the individual plies in an uncured state. The function of the core is to impart rigidity to the laminated structure. Insofar as this part of the laminate cannot be seen and additionally since this part is not subjected to abrasive conditions, the core is customarily fabricated from relatively inexpensive materials. Suitable core stock members are prepared using a low cost kraft paper together with the least amount of a phenolic resin capable of providing a good bond for the core assembly.

A so-called print sheet supplies the decorative effect associated with the laminate, and in preparing the assembly for lamination, it is placed on top of the sheets constituting the core member. The print sheet generally consists of a pure grade of an absorbent α-cellulose or regenerated cellulose paper which has been printed with a design or dyed or pigmented to impart a solid color thereto. Printed designs may be employed having an unlimited range or form of artistic effects so long as the inks of the coloring matter contained therein are nonbleeding in the resin comprising the infused resin component of the print sheet or that of the subsequently applied overlay sheet. The print sheet also serves as a barrier sheet for the core stock member, thus masking the unattractive appearance of the core stock and additionally barring any extensive bleeding or migration of the phenolic resinous material contained thereby that otherwise might be apparent on the decorative surface of the laminate. The print sheet is required to have good appearance and durability. These properties are conventionally achieved by impregnating the print sheet with an aminoplast resinous composition. The aminoplast resins, whether they comprise unmodified or modified condensates, are constituted to impart color stability and resistance to discoloration and degradation due to heat and light to the print sheet, and also to impart hardness and resistance to abrasion, solvents and chemicals to the overlay, or to the print sheet if no overlay is used. In addition, the aminoplast resins give a thorough impregnation, thereby insuring a complete bond in the laminate.

Because of the excessive wear to which decorative laminate surfaces, especially horizontal working surfaces such as table tops, are generally subjected, it is conventional practice in this art to lend greater durability to the laminate structure by applying an overlay sheet over the print sheet. The overlay sheet, often-times called the decorative overlay, usually consists of a single sheet of paper, generally a very high grade of α-cellulose paper, treated with an aminoplast resinous composition more often than not corresponding to that used to impregnate the print sheet member of the assembly. The primary objective in the use of the overlay sheet is to impart durability to the print sheet without detracting from its appearance. As mentioned, the aminoplast resins are favored for impregnating the overlay sheet because of their aforementioned desirable properties, and when thus employed are present therein in a very substantial amount. The resin content of the overlay sheet is customarily between about 60% and 70% of the treated sheet. In comparison, the conventional resin content of the print sheet is in the order of about 40% to 50% of the treated sheet and the resin content of the core sheets ranges from about 25% to 35% of said treated sheets. The conventional decorative laminates are usually from about 50 to 60 mils thick. Of this thickness the overlay sheet represents about 2 to 4 mils, the print sheet is conventionally in the order of about 5 to 9 mils and the core member constitutes the rest of this assembly.

When a conventional decorative laminate assembly is cured under the usual applicable pressures, that is, from about 800 to 1500 p.s.i., the curing is effected at a temperature range wherein the aminoplast resin as well as the phenolic resin present is regarded as being completely cured. The usual temperature range employed to effect complete curing is from about 135° C. to 145° C. The time required at a temperature within this range is in the order of approximately 20 minutes although for all conventional unmodified aminoplast resins, a period anywhere from about 5 minutes shorter or longer can be tolerated. When cured under the stated conditions the laminate, and particularly the surface area thereof, will be rendered highly resistant to heat, that is, objects at temperatures ranging as high as about 180° C. may be placed on the surface of the laminate for as long as 20 minutes without any visible effect upon the plastic. Also such a composite cured to a point where it exhibits adequate heat resistance in the nature described will also manifest excellent chemical resistance.

Aminoplast resinous compositions previously employed in the production of decorative laminates have not been entirely satisfactory, however, inasmuch as the resins exhibit stiff flow at the usual operating temperatures. Various modifiers have been incorporated into these resins to improve their plastic flow characteristics during cure, and other modifiers have been utilized to improve dimensional stability and workability or to impart any number of additional desirable properties to the cured resins.

Many of the modifiers that have been employed in the prior art to enhance the physical properties of the cured aminoplast resins contribute undesirable characteristics to the resinous compositions during the preparation of the laminate. For example, certain modifiers, when incorporated into the resinous syrup, produce an unstable composition. Also, in certain instances the resinous composition, after impregnation and during drying has a tendency to froth. As a result, the drying of the impregnated paper must be carried out at an uneconomical rate in order to avoid this frothing.

A further difficulty inherent in prior art aminoplast resinous compositions used in the preparation of decorative laminates is the above-mentioned phenomenon of "bleeding." When an aminoplast resin-impregnated decorative overlay or print sheet is used in combination with a core assembly impregnated with a different thermosetting resinous composition, e.g., a phenol-formaldehyde resin, there is a tendency for the resin material of the core assembly to migrate into the print sheet, producing discoloration on exposure of the laminate to light. By using an increased aminoplast resin content in the print or overlay sheet, the tendency of the core assembly to migrate is reduced. However, the use of increased amounts of aminoplast resin sufficient to achieve the desired purpose may be considered uneconomical for most practical purposes.

But by far the most serious defect possessed by prior art aminoplast resin-containing laminates assembled and cured in the manner described above lies in the fact that they cannot be post-formed to any appreciable extent, for when post-forming is attempted, such laminates readily crack.

"Post-formability" refers to the ability of a laminated sheet to be bent without cracking to form a right angle having a narrow arc at its apex. This property is important for both functional and decorative purposes. For example, in the manufacture of table tops having contoured edges or in the preparation of sink working areas where the splash appendage is desirably an unbroken continuation of the horizontal surface, it may be desirable to post-form the shape of the decorative laminate as received from the fabricator thereof. While it is possible for the laminator to achieve any size flat sheet desired during the manufacture of the laminate, it is virtually impossible for him to produce the multiplicity of particular contoured shapes and custom designs required by individual customers. Thus, there is an important need for high pressure laminates which may be shaped "on the job" and yet conform to the high standard of physical properties ordinarily associated with such articles.

In standard post-forming procedures, the laminate is heated along the line to be formed, and then bent to the desired angle. There are many kinds of post-forming equipment, but essentially the preheated laminate is bent around a bar to a right angle having a radius of from $3/4''-1''$ at the apex of the bend, and then allowed to cool somewhat before being removed from the post-forming apparatus in order to overcome any tendency of the laminate to "spring back" to its original shape. Ideally, the resin binder in a post-formable laminated sheet should be capable of being cured to the stage at which it is sufficiently heat resistant and yet flexible enough when exposed to heat in the post-forming operation so as to give a bend having a right angle with a radius of $1/8''-1/2''$ at its apex. Present NEMA (National Electrical Manufacturers Association) Standards call for a bend having a right angle with a radius of $3/4''$ or less at its apex.

Laminators are continually trying to approach the ideal radius and at the same time retain the excellent physical properties of the original aminoplast laminate, and several attempts to obtain such improved post-formable decorative aminoplast laminates have been practiced in the prior art with varying degrees of success. One such method consists of somewhat undercuring the entire laminating assembly during lamination. While this method permits the assembly to be post-formed, the heat and chemical resistance of the resulting article are unsatisfactory. In addition, such post-formed laminates develop a dull surface appearance in the area surrounding the line where the shaping or bending force is applied. In general, these deficiencies inhere in most of the prior art attempts to prepare satisfactory post-formable decorative aminoplast laminates.

It is, therefore, an object of our invention to prepare novel, modified aminoplast resinous compositions.

It is also an object of our invention to prepare novel, modified aminotriazine-aldehyde resinous compositions, and particularly, melamine-formaldehyde resinous compositions, which will overcome the aforementioned deficiencies in prior art decorative laminates and permit laminates prepared therefrom to be converted into post-formed shapes having right angles with radii of $3/16''-5/8''$ at their apexes while retaining good heat, abrasion, solvent and chemical resistance and good surface appearance.

These and other objects of our invention are accomplished by modifying a resinous reaction product of ingredients comprising (a) an aminotriazine containing at least 2 amidogen groups, each having at least one aldehyde-reactable hydrogen atom attached to the amidogen nitrogen atom, e.g., melamine and (b) an aldehyde, e.g., formaldehyde with a three-component modifier system comprising (c) an α-alkyl-D-glucoside, e.g., α-methyl-D-glucoside, (d) an N-methylol sulfonamide, e.g., N-methylol-toluene sulfonamide, and (e) one or more amines, in certain prescribed quantities, as will be set forth more fully hereinbelow.

As is well known, aminoplast resins are synthetic resins prepared by the condensation reaction of an amino (including imino) or amido (including imido) compound with an aldehyde, a typical example being melamine-formaldehyde resins. Aminoplast resins of the type which may be modified in accordance with the present invention are produced by techniques well known in the art, as shown, for example, in U.S. Patent No. 2,197,357 to Widmer et al., and in U.S. Patent No. 2,260,239 to Talbot. The mol ratio of aldehyde to aminotriazine in such resinous compositions is not critical, and may be within the order of from about 1.5:1 to about 6:1, respectively, depending on the nature of the starting materials and the characteristics desired in the final products, but it is preferred that the mol ratio be within the order of from about 2:1 to about 4:1, respectively.

We prefer to use those partially polymerized aldehyde-aminotriazine resins which are heat curable or potentially heat curable resinous reaction products of ingredients comprising melamine and formaldehyde. However, other heat curable or potentially heat curable partially polymerized aldehyde-aminotriazine resinous reaction products may also be employed. Aminotriazines containing at least two amidogen groups, each having at least one aldehyde-reactable hydrogen atom attached to the amidogen nitrogen atom, which may be reacted with an aldehyde to provide the resin which is modified in accordance with our invention include, among others, the triamino-s-triazines represented by the structural formula:

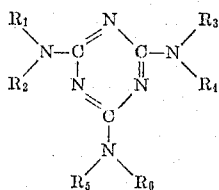

wherein any of $R_1$ to $R_6$ may be hydrogen, alkyl, cycloalkyl, alkenyl, cycloalkenyl, aryl, aralkyl, alkaryl, hydroxyalkyl, amino or substituted amino (e.g., alkylamino, dialkylamino, etc.), with the proviso that in at least two of the amidogen substituents directly attached to the carbon atoms of the triazine nucleus at least one R is hydrogen. An illustrative but by no means exhaustive enumeration of such amino-s-triazines includes the following: 2-mono-R-amino-4,6-diamino-s-triazines such as the N-methyl, N-butyl, N-phenyl, N-tolyl and N-cyclohexyl melamines; 2,4,6-tris (mono-R-amino)-s-triazines such as 2,4,6-tris (methylamino)-s-triazine; 2-di-R-amino-4,6-bis (mono-R-amino)-s-triazines such as 2-dimethylamino-4,6-bis (methylamino)-s-triazine; the methylolmelamines, such as mono-, di-, and trimethylolmelamines, $N^2$-dimethylol-$N^4$, $N^6$-bis (methylol)-melamine; hydrazino-s-triazines, such as 2,4,6-trihydrazino-s-triazine; and the like.

Another suitable class of aminotriazines comprises the diamino-s-triazines represented by the structural formula:

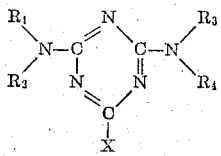

wherein each of $R_1$ to $R_4$ have the same meaning as given above and in which X is hydrogen, hydroxy, alkyl, cycloalkyl, alkenyl, cycloalkenyl, aryl, aralkyl, alkaryl, or hydroxyalkyl, again with the proviso that in each of the amidogen substituents directly attached to the carbon atoms of the triazine nucleus at least one R is hydrogen.

Illustrative of this class of s-triazines are the following: guanamines, such as formoguanamine, acetoguanamine, capryloguanamine, methacryloguanamine, sorboguanamine, adipoguanamine, sebacoguanamine, $\Delta^3$-tetrahydrobenzoguanamine, hexahydrobenzoguanamine, benzoguanamine, phenylacetoguanamine, diphenyladipoguanamine; ammeline, and the like.

Any suitable aldehyde may be utilized as a reactant with the aminotriazine in preparing the aminoplast resin. We prefer to employ formaldehyde, either as such or as an aqueous solution. Other aldehydes such as, for example, acetaldehyde, propionaldehyde, butyraldehyde, benzaldehyde, furfural; mixtures thereof, or mixtures of formaldehyde with other such aldehydes may be employed. Paraformaldehyde, hexamethylenetetramine, trioxymethylene, paraldehyde, or other compounds engendering aldehydes may also be employed.

The properties desired in the finished product and economic considerations are among the features which will determine the choice of the particular aldehyde and aminotriazine employed.

As previously stated, the modifier employed in accordance with the present invention is a three-component system. One component of the modifier system is an α-alkyl-D-glucoside in which the alkyl group may contain from one to four carbon atoms, such as α-methyl-D-glucoside, α-ethyl-D-glycoside, α-butyl-D-glucoside and the like. Prior to the present invention, aminoplast resins have been modified by the addition of various sugars, such as sucrose, lactose, glucose and the like. However, due to the many possible isomeric and tautomeric forms of these sugars, compositions possessing uniform properties could not be obtained in each instance. By the employment of the α-alkyl-D-glucosides, as herein set forth, wherein the lactol ring is definitely fixed, uniformly improved properties are insured in the modified composition. Not only is this component of the modifier utilized in the present invention relatively inexpensive, it is also water white, and when incorporated into the resinous composition yields a composition that is also water white and has excellent color stability. It has been previously suggested that α-alkyl-D-glucosides be incorporated into alkylated aminoplast resins for certain purposes. In the present case the aminoplast resins, specifically melamine-formaldehyde resins, which are herein modified are substantially non-alkylated. As is well known, alkylated melamine-formaldehyde resins are obtained by reacting the melamine-formaldehyde condensation product in the presence of a compound containing an alcoholic hydroxy group whereby the methylol derivative of the condensation product reacts with the alcoholic hydroxy group of the modifier. The alkylated and non-alkylated melamine-formaldehyde condensation products are physically and chemically distinct. In preparing the modified resinous compositions of the present invention, any alkylation is incidental and occurs only as a result of the solvent used, if present, during the formation of the condensation product such as, for example, small amounts of methanol which may be present in the aqueous formaldehyde solution.

The second component of the modifier employed in the preparation of the novel compositions of the present invention is an N-methylol sulfonamide of the general formula:

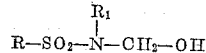

wherein R represents an organic radical, e.g., alkyl, aryl, alkaryl or aralkyl and $R_1$ represents hydrogen, alkyl, alkylol, aryl or an acyl group. These compounds may be produced in any suitable manner, such as by the reaction of a sulfonyl chloride with a methylol amine, or by the methylolation of a sulfonamide with formaldehyde e.g., in situ. Examples of such N-methylol sulfonamides include N-methylol-toluene sulfonamide, N-methylol-p-cymene sulfonamide, N-methylol-xylene sulfonamide, N-methylol-tetralin sulfonamide, N,N'-dimethylol-toluene disulfonamide, N,N'-dimethylol-diphenyl disulfonamide, and the like.

N-methylol sulfonamide modifiers as herein defined have previously been suggested for incorporation in melamine-formaldehyde condensation products, for example, see U.S. Patent No. 2,326,728 to Schroy. The resinous compositions prepared in accordance with the above-identified patent, while solving a particular problem, nevertheless present certain disadvantages when employed in the production of laminated articles. It was found necessary to incorporate large amounts of alcohol into the solvent in order to obtain a soluble or dispersible syrup or varnish that could be employed for impregnation of the laminating sheets. It was also found that the resinous syrups or varnishes thus produced had limited stability. Also, when it was desired to dry impregnated laminating sheets rapidly at elevated temperatures, i.e., under typical conditions employed when utilizing modern impregnation means, the treated laminates had a tendency to flake, frost, and blister, resulting in resin impregnated laminating sheets that were difficult to handle.

By employing the novel three-component modifying system as herein set forth and described, the disadvantages previously experienced are reduced. Also, the amount of alcohol necessary in the solvent in order to obtain a solution or dispersion of the resinous composition is greatly reduced. This not only aids in eliminating the frothing problem but also reduces fire hazards which always accompany the use of solvent systems containing large amounts of alcohol. Furthermore, impregnation may be carried out at high speeds to give laminating sheets which are thoroughly wet throughout. In addition to these factors, it has been found that the tendency towards bleeding of the resinous composition of the core assembly is substantially reduced.

The ability possessed by laminates prepared from our novel, modified aminoplast resinous compositions to be converted into post-formed shapes having right angles with radii of $\frac{3}{16}''-\frac{5}{8}''$ at their apexes is believed to be particularly due to the amine constituent of the three-component modifier system employed in accordance with the present invention, although the overall improvements in physical and chemical properties resulting from the remaining components of the modifier system also contribute to this effect.

The alkylene polyamines, including the polyalkylene polyamines, constitute the preferred class of amines which may be employed as modifiers in the practice of our invention. 3,3'-iminobispropylamine is especially suitable, but other alkylene polyamines such as, for example, diethylene triamine, triethylene tetramine, tetraethylene pentamine, tris-(3-aminopropyl)amine, ethylene diamine, trimethylene diamine, tetramethylene diamine, propylene diamine (1,2-diaminopropane), and mixtures thereof, may also be employed.

Our invention is not limited to the use of the above-mentioned polyamines. A wide variety of other amines or mixtures of amines may also be employed. For example, we may use primary, secondary or tertiary amines in which the amino group is attached to a primary, secondary or tertiary aliphatic carbon atom. Such amines may have as substituents hydrocarbon radicals, e.g., alkyl, isoalkyl, cycloalkyl, cycloalkenyl, aryl, aralkyl, and alkaryl radicals which may also contain hydrocarbon, substituted hydrocarbon and non-hydrocarbon substituents; heterocyclic or substituted heterocyclic radicals, and various combinations thereof. Specific examples of such amines include methylamine, isopropylamine, 2-aminobutane, t-butyl amine, 2-amino-4-methylpentane, various amyl, hexyl, heptyl, octyl and higher homologous primary amines wherein the amine group is attached to a primary, secondary or tertiary carbon atom; cyclopentyl amine, alkylated cyclopentyl amines, cyclohexylamine, mono-, di- and trimethyl cyclohexylamines, other alkylated cyclohexylamines; benzylamine, β-phenylethylamine, alkylated benzylamines, tetrahydro-β-naphthylamine; dimethyl-, di-ethyl-, di-n-propyl-, di-isopropl-, and di-butyl amine; various secondary amines derived from amyl, hexyl, heptyl, octyl, and higher homologous alkyl groups, methyl isobutyl amine, N-methyl-N-t-butyl amine, N-alkyl-N-cyclohexyl amines, N-alkyl-N-benzyl amines, and their homologs and analogs; dicyclopentyl amine, dicyclohexyl amine, alkylated dicyclohexyl amines; diphenylamine, dibenzylamine, di-(β-phenylethyl)amine; trimethyl-, triethyl-, tri-n-propyl-, tri-isopropyl-, and tributyl amine, higher homologous and isomeric trialkylamines; various N-substituted tertiary amines having different organic radicals on the amine nitrogen atom, e.g., alkyl, alicyclic, aralkyl and like homologs and analogs; alkylol and alkyl alkylol amines such as ethanolamine, propanolamine, diethanolamine, triethanolamine, methylmethanolamine, methylethanolamine, ethylmethanolamine, dimethylmethanolamine, dimethylethanolamine, diethylethanolamine, dimethylpropanolamine, methyldimethanolamine, ethyldiethanolamine, propyldimethanolamine; heterocycylic amines such as piperidine, alkylated piperidines, morpholine, and the like.

Compounds of the type set forth above have previously been utilized as modifiers for melamine-formaldehyde resins. Thus, U.S. 2,769,799 and 2,769,800 to Suen et al. disclose that by reacting melamine, formaldehyde (or a partially polymerized melamine-formaldehyde resin) and large amounts of a polyfunctional aliphatic polyamine such as 3,3'-iminobispropylamine (amounts ranging from about 0.5 atom to about 10 atoms of basic nitrogen present in the polyfunctional aliphatic polyamine per mol of melamine, i.e., at least 10% by weight) in the presence of an acid, modified resin compositions are obtained which are particularly useful as wet strengthening agents for paper. However, these patents reflect no appreciation of either the three-component modifier system employed in the practice of the present invention or of the use of very small amounts of such amine modifiers, both of which features must be observed in order to obtain aminoplast resinous compositions which will impart good post-forming properties to laminates prepared therefrom.

The total amount of α-alkyl-D-glucoside and N-methylol sulfonamide incorporated into the aminotriazinealdehyde condensate in accordance with the present invention may be within the order of from about 1% to about 35% by weight, based on the total weight of modified resinous composition (aminotriazine-aldehyde resin plus modifiers), but it is preferred that the total amount of these two modifiers employed be within the order of from about 10% to about 30% by weight, based on the total weight of the resinous composition. The amount of α-alkyl-D-glucoside employed may range from about 0.5% to about 34.5% by weight, and correspondingly, the amount of N-methylol sulfonamide may vary from about 34.5% to about 0.5% by weight, based on the total weight of the resinous composition. For certain applications, it will be desirable to employ a preponderance of α-alkyl-D-glucoside, whereas in other applications it may be desired to incorporate a greater amount of the N-methylol sulfonamide. For optimum results, however, it is preferred that the weight ratio of these two modifiers be within the order of from about 40:60 to about 60:40, respectively.

The amount of amine modifier added may vary from about 0.05% to about 5%, based on the total weight of the modified resinous composition, depending on the basicity of the particular amine or mixture of amines employed. In the case of the alkylene polyamines, the amount added will be within the range of from about 0.1% to about 1.5%, by weight.

In preparing the novel, modified aminotriazinealdehyde condensates of this invention, the aldehyde and aminotriazine are heat-reacted, e.g., at temperatures ranging from about 40° C. to about reflux temperature, i.e., about 100° C., for periods of time ranging from about 30 minutes to about 120 minutes, either alone or in the presence of a suitable solvent, such as water or a mixture of water and a lower aliphatic alcohol.

The N-methylol sulfonamide modifier may be formed in situ during the condensation reaction of the aldehyde and aminotriazine, e.g., by the methylolation of a sulfonamide, such as toluene sulfonamide, with formaldehyde, or, alternatively, this modifier may be separately formed and then introduced into the aminotriazine-aldehyde composition (when it is desired to form the N-methylol sulfonamide in situ during the condensation reaction of the aminotriazine and aldehyde, it is necessary that an excess molar proportion of the aldehyde be present equal to the molar proportion of the compound that forms the methylol derivative). In any event, it is necessary that the N-methylol sulfonamide be introduced into the aminotriazine-aldehyde composition while said composition is in a liquid state, inasmuch as it appears that aminotriazine-aldehyde condensates react with the N-methylol sulfonamides.

If desired, the α-alkyl-D-glucoside may also be introduced into the aminotriazine-aldehyde composition during the condensation reaction. Alternatively, the condensation product may be dried by any conventional method, such as by pan drying, tray drying, kettle drying, or spray drying, preferably by the latter method, and the α-alkyl-D-glucoside then incorporated into the dry resinous composition at any time prior to the cure of the composition.

As is well known, aminoplast condensation reactions are influenced by pH, the rate of reaction being accelerated by low pH. At relatively high pH's, i.e., significantly greater than 10, the reaction is slow, while at relatively low pH's, the reaction is so fast as to be uncontrollable. At either relatively high or relatively low pH's, the nature of the product is such that it has little utility in thermosetting applications such as laminating and molding resins. Thus, the practical pH working range for the preparation of an aminotriazine-aldehyde resin suitable for use in laminating and molding operations is generally given as from about 6.5 to about 10, although wider and narrower pH ranges may be employed under certain conditions.

The amine component of our novel modifier system may be initially added in toto to the condensation reaction mixture. Alternatively, a part of the total amount of amine to be added may be introduced initially and the rest either added in whole or in part during later stages of the reaction or blended together with the resinous composition after the condensation reaction has been carried to the desired stage of completion. This expedient provides an excellent means of controlling the pH ranges at which the reaction is carried out. For example, a minor amount of amine may be added to a condensation reaction mixture comprising aminotriazine, aldehyde, N-methyloltoluene sulfonamide and optionally, α-alkyl-D-glucoside, to maintain a slurry pH of from about 7.0 to about 8.5. When the desired stage of reaction is accomplished, the pH may again be adjusted with more amine to a working pH within the range of from about 8.0 to about 9.5 or higher. Of course, any other suitable substance, e.g., weakly acidic or basic organic or inorganic solutions, may be employed to adjust the pH when required.

In order that those skilled in the art may more fully understand the inventive concept presented herein, the following illustrative examples are set forth. These examples are given by way of illustration and should not be considered as expressing limitations unless so set forth in the appended claims. All parts and percentages are by weight, unless otherwise stated.

EXAMPLE I 126 parts of melamine, 183 parts of formaldehyde (as a 37% aqueous solution), 17.2 parts of toluene sulfonamide (a mixture of the ortho and para isomers in a weight ratio of 40:60, respectively), 18.4 parts of α-methyl-D-glucoside, and 0.14 part of 3,3'-iminobispropylamine (approximately 20% of the total amount to be added; sufficient to adjust the slurry pH to 7.8–8.2) were introduced into a suitable reaction vessel equipped with thermometer, stirrer, and reflux condenser. The slurry was heated for 30 minutes to reach reflux temperature and held at reflux for an additional 20 minutes. The resinous composition was cooled to 60° C., and 0.55 part of 3,3'-iminobispropylamine was blended therewith. The resulting resin syrup was then cooled to room temperature; it could either be used directly for impregnating paper or spray dried by conventional means to yield a finely divided white powder.

In order to illustrate the excellent post-forming properties possessed by decorative laminates containing the novel modified aminoplast resinous compositions of this invention, a series of comparisons were made between decorative laminates whose print papers had been impregnated with the resin of Example I (group I) and laminates (group II) prepared in the same manner and identical in every respect to those of group I with one exception. The melamine-formaldehyde resin used in the laminates of group II, while containing the same amounts of toluene sulfonamide and α-methyl-D-glucoside as the resin used in the laminates of group I, did not contain any of the third essential component of the modifying system incorporated in the resin of Example I, namely, 3,3'-iminobispropylamine.

In testing the post-forming characteristics of decorative laminates, the procedure prescribed in the NEMA Standards Publication for laminated thermosetting decorative sheets was employed. More specifically, this method is described in detail in section LP2–2.11 of said publication. The method consists of employing laminated specimens of size 2 inches by 8 inches. A standard heater was utilized whereon the test specimen was placed 3 inches above the heating elements. A potential across the standard heater was maintained at 120 volts. When the specimen reached constant temperature, it was placed in a bending jig with the decorative face down and formed therein (the NEMA Standards specify that the closing time after initial contact of the force with the specimen is not to exceed 1 second). The specimen with the pressure exerted thereon was allowed to form while cooling in the jig for 1 minute. The forming or shaping portion of the jig consisted of two engageable blocks, the lower member of which, upon which the specimen face was placed, consisted of a stationary and fixed block of prescribed dimensions having a cavity in the shape of a 90° notch. The top forming block or force was of a male design capable of engaging the notch of the bottom block. The bottom extremity of the force consisting of a longitudinal edge, the cross-sectional area of which corresponds to an arc of a circle. The radius of the circle determined the extent to which the specimen was shaped. The standard arc prescribed in testing post-forming characteristics of decorative laminates is that of a circle having a radius of ¾ inch.

The results of the comparative tests are summarized as follows:

*Table 1*

| Laminates Nos. | Minimum Post-Formed Radius (in inches) | |
|---|---|---|
| | Group I | Group II |
| 1 | ½ | ¾ |
| 2 | ⅝ | ¾ |
| 3 | 9/16 | ⅝ |
| 4 | 9/16 | ⅝ |

The laminates of group I, which contain print sheets impregnated with melamine-formaldehyde resin modified in accordance with our invention, were all capable of being post-formed to considerably sharper angles than the corresponding laminates of group II, which contain only two of the components found in the three-component modifier system used in the impregnating resins of the group I laminates. If the modified resin were used in the overlay as well as in the print paper, even better post-formability would result, e.g., the radius at the apex would be decreased by as much as another ¼ inch. However, some sacrifice in surface properties would also result.

EXAMPLE II 126 parts of melamine, 183 parts of 37% aqueous formaldehyde and 0.14 part of 3,3'-iminobispropylamine at a slurry pH of 7.8–8.2 were introduced into a suitable reaction vessel and heated at 80° C. for one hour. 17.2 parts of toluene sulfonamide (40:60—ortho, para isomer mixture) and 18.4 parts of α-methyl-D-glucoside were then added, and the resinous syrup was further heat reacted for ½ hour at 80° C. The resinous composition was then cooled to 60° C. and 0.55 part of 3,3'-iminobispropylamine blended therewith. The resin syrup, when cooled to room temperature, could be used directly for impregnating paper or could be spray dried.

EXAMPLE III

A slurry of 126 parts of melamine, 183 parts of 37% aqueous formaldehyde, 18.4 parts of α-methyl-D-glucoside, 17.2 parts of toluene sulfonamide (40:60—ortho, para isomer mixture) and 0.69 part of 3,3'-iminobispropylamine, contained in a suitable reaction vessel, were heated for 30 minutes to reach reflux temperature and then held at reflux for an additional ten minutes. The resulting resin syrup was allowed to cool to room temperature and was then spray dried to give a finely divided white powder.

EXAMPLE IV 2.3 parts of diethylethanolamine were added to a mixture of 126 parts of melamine, 183 parts of formaldehyde (as a 37% aqueous solution), 17.2 parts toluene sulfonamide (40:60—ortho, para isomer mixture), and 18.4 parts of α-methyl-D-glucoside, and the resulting slurry heated for a total of 40 minutes (30 minutes to reach reflux temperature, 10 minutes at reflux). After cooling to room temperature, the resinous syrup was spray dried to a fine white powder.

Conventional laminating techniques may be employed to prepare thermosetting decorative laminates containing our novel, modified aminoplast resinous compositions. The laminating sheets are first saturated with a solution or syrup of the resinous material. In view of the novel properties of our resinous compositions, they may be dissolved or dispersed in entirely aqueous media, but preferably a minor amount of alcohol will be added in order to obtain greater ease of solution or dispersion of the composition. Thus, the solvent employed may contain 80 parts of water and only 20 parts of a water-soluble alcohol. It is preferred, however, that the solvent utilized contain as much as 95 parts of water and consequently only 5 parts of a water-soluble alcohol. The water-soluble alcohols utilized are the lower alkyl saturated monohydric alcohols, such as methanol, ethanol, propanol, isopropanol, n-butanol, isobutanol, and the like. The dispersion or syrup of the melamine-formaldehyde condensation product generally contains from about 45% to about 55% resin solids. In some applications, however, it may be desirable to reduce the resin solids content to as low as about 20% and for other applications to as high as about 60%. The amount of the modified resinous composition employed in the production of the laminates may vary from about 30% to about 80% by weight, based on the total weight of the laminate. It is apparent that the amount of the resin present in the laminate will vary, depending upon the ultimate use of the product and also upon other considerations, as for example the type of laminating sheet being treated. After the laminating sheets are impregnated, they are dried at elevated temperatures to a desired volatile content. The sheets are then assembled in multiple layers between molding press platens and cured at elevated temperatures and pressures to form the laminated articles. In decorative laminates, the decorative print sheet alone can be impregnated with the modified resin, or, as previously mentioned, both the overlay and the decorative print sheets may be impregnated. For economical reasons, the core assembly is usually impregnated with a different and cheaper thermosetting resin, as for example a phenol-formaldehyde condensation product. In industrial laminates wherein the sheets are usually of the same material, all of the sheets may be treated with the modified aminoplast resin. Sheets of fibrous material, such as α-cellulose, paper, viscose rayon paper, glass cloth, or cloth formed of silk, cotton, wool, rayon or other synthetic fibers, may be utilized in the preparation of the laminated articles.

The resinous syrups of the present invention are preferably employed to impregnate α-cellulose or cellulosic saturating sheets which are employed in the production of decorative laminated articles. In this instance, the cellulosic sheets are combined with a core assembly impregnated with a phenol-formaldehyde condensation product and then cured under heat and pressure to form the laminated article. A decorative overlay sheet having a thickness of about 2 to 5 mils is impregnated with from about 60% to about 75% by weight of the resinous syrup. On the other hand, the print sheet, which may be pigmented, has a thickness of about 6 to 12 mils and is impregnated with the resin to the extent of about 30% to about 55% by weight, and preferably from about 35% to about 45% by weight. Impregnation of the cellulosic laminating sheets may be carried out by such methods as dipping, roll coating, spraying or the like. The resin impregnated sheets may be conveniently dried in a forced hot air oven or by infrared heating means to a volatile content less than about 6% by weight, and, preferably, in the range of from about 3% to about 4% by weight. In certain instances it is desirable to lower the volatile content to as little as 0.5% by weight, but in this case extreme drying conditions are required. When the cellulosic sheets impregnated with the novel resinous composition of this invention are employed with a core assembly impregnated with a phenol-formaldehyde condensation product, the core assembly is usually impregnated in an amount of about 25% to 35%, preferably about 30% by weight and dried to a volatile content of less than about 10% by weight. After the cellulosic sheets are combined with a core assembly, the total assembly is cured at elevated temperatures and pressures, e.g., at temperatures within the range of from about 145° C. to about 165° C. and pressures in the order of from about 800 to about 1500 p.s.i., to form the laminate. The laminate, if desired, may be buffed to produce glossy or satiny effects thereon. When the laminate is cured between highly polished stainless steel platens, it is usually not necessary to buff the laminate in order to product a glossy effect.

It will be obvious that dyes, pigments and other colorants may also be incorporated into the resinous compositions to alter the visual appearance and the optical properties of the finished product. In certain instances it is desirable to incorporate curing agents, such as p-toluene sulfonic acid, phthalic anhydride, phthalic acid, benzoic acid and the like into the resinous compositions. In addition to laminates, molded articles may also be prepared, and catalysts, such as phthalic anhydride, as well as mold lubricants such as zinc stearate, calcium stearate, glycerol mono-stearate and the like may also be incorporated in our novel, modified aminoplast resinous compositions to facilitate the molding thereof. The additives herein discussed may be mixed with the resinous composition at any point prior to the cure of the material by methods well known in the art.

It will be obvious that other changes and variations may be made in carrying out the present invention without departing from the spirit and scope thereof as defined in the appended claims.

We claim:

1. A modified resinous composition of matter which imparts improved post-forming characteristics to decorative laminates prepared therefrom which comprises an aminotriazine-aldehyde resin having a mol ratio of aldehyde to aminotriazine of from about 1.5:1 to about 6:1, respectively, the aminotriazine component of which initially contains at least two amidogen groups each having at least one aldehyde-reactable hydrogen atom attached to the amidogen nitrogen atom, modified with (1) an α-alkyl-D-glucoside, (2) an N-methylol sulfonamide, the total amount of said (1) and said (2) present being from about 1% to about 35% by weight, based on the total weight of the modified resinous composition, and from about 0.1% to about 1.5% by weight, based on the total weight of the modified resinous composition of (3) an alkylene polyamine.

2. A modified resinous composition of matter which imparts improved post-forming characteristics to decorative laminates prepared therefrom which comprises an aminotriazine-aldehyde resin having a mol ratio of aldehyde to aminotriazine of from about 1.5:1 to about 6:1, respectively, the aminotriazine component of which initially contains at least two amidogen groups each having at least one aldehyde-reactable hydrogen atom attached to the amidogen nitrogen atom, modified with (1) an α-alkyl-D-glucoside, (2) an N-methylol sulfonamide, the total amount of said (1) and said (2) present being from about 1% to about 35% by weight, based on the total weight of the modified resinous composition, and from about 0.1% to about 1.5% by weight, based on the total weight of the modified resinous composition of (3) a polyalkylene polyamine.

3. A modified resinous composition of matter which imparts improved post-forming characteristics to decorative laminates prepared therefrom which comprises an aminotriazine-aldehyde resin having a mol ratio of aldehyde to aminotriazine of from about 1.5:1 to about 6:1, respectively, the aminotriazine component of which initially contains at least two amidogen groups each having at least one aldehyde-reactable hydrogen atom attached to the amidogen nitrogen atom, modified with (1) α-methyl-D-glucoside, (2) N-methylol p-toluene sulfonamide, the total amount of said (1) and said (2) present being from about 1% to about 35% by weight, based on the total weight of the modified resinous composition, and from about 0.1% to about 1.5% by weight, based on the total weight of the modified resinous composition of (3) an alkylene polyamine.

4. A modified resinous composition of matter which imparts improved post-forming characteriistics to decorative laminates prepared therefrom which comprises an aminotriazine-aldehyde resin having a mole ratio of aldehyde to aminotriazine of from about 1.5:1 to about 6:1, respectively, the aminotriazine component of which initially contains at least two amidogen groups each having at least one aldehyde-reactable hydrogen atom attached to the amidogen nitrogen atom, modified with (1) α-methyl-D-glucoside, (2) N-methylol p-toluene sulfonamide, the total amount of said (1) and said (2) present being from about 1% to about 35% by weight, based on the total weight of the modified resinous composition, and from about 0.1% to about 1.5% by weight, based on the total weight of the modified resinous composition of (3) a polyalkylene polyamine.

5. A modified resinous composition of matter which imparts improved post-forming characteristics to decorative laminates prepared therefrom which comprises a melamine-formaldehyde resin having a mol ratio of formaldehyde to melamine of from about 1.5:1 to about 6:1, respectively, modified with (1) α-methyl-D-glucoside, (2) N-methylol p-toluene sulfonamide, the total amount of said (1) and said (2) present being from about 1% to about 35% by weight, based on the total weight of the modified resinous composition and from about 0.1% to about 1.5% by weight, based on the total weight of the modified resinous composition of (3) 3,3'-iminobispropylamine.

6. A process for the preparation of a modified resinous composition of matter which imparts improved post-forming charcteristics to decorative laminates prepared therefrom which comprises: (1) heating at temperatures ranging from about 40° C. to about 100° C. for from about 30 to 120 minutes a mixture comprising (A) an aminotriazine having at least two amidogen groups, each having at least one aldehyde-reactable hydrogen atom attached to the amidogen nitrogen atom, (B) an aldehyde, the mol ratio of said (B) to said (A) being from about 1.5:1 to about 6:1, respectively, (C) an α-alkyl-D-glucoside (D) an N-methylol sulfonamide, the total amount of said (C) and said (D) present being from about 1% to about 35% by weight, based on the total weight of the modified resinous composition, and (E) an amount of an alkylene polyamine sufficient to maintain the pH of the mixture within the range of from about 7.0 to about 8.5, to form a resinous syrup, (2) cooling said syrup to at least 60° C., (3) adding to said cooled syrup an additional amount of an alkylene polyamine sufficient to bring the total amount of alkylene polyamine present to within the range of from about 0.1% to about 1.5% by weight, based on total weight of the modified resinous composition, and (4) recovering the resulting modified resinous composition.

7. A process for the preparation of a modified resinous composition of matter which imparts improved post-forming characteristics to decorative laminates prepared therefrom which comprises: (1) heating at temperatures ranging from about 40° C. to about 100° C. for from about 30 to 120 minutes a mixture comprising (A) melamine, (B) formaldehyde, the mol ratio of said (B) to said (A) being from about 1.5:1 to about 6:1, respectively, (C) α-methyl-D-glucoside, (D) N-methylol p-toluene sulfonamide, the total amount of said (C) and said (D) present being from about 1% to about 35% by weight, based on the total weight of the modified resinous composition, and (E) an amount of 3,3'-iminobispropylamine sufficient to maintain the pH of the mixture within the range of from about 7.0 to about 8.5, to form a resinous syrup, (2) cooling said syrup to at least 60° C., (3) adding to said cooled syrup an additional amount of 3,3'-iminobispropylamine sufficient to bring the total amount of 3,3'-iminobispropylamine present to within the range of from about 0.1% to about 1.5% by weight, based on total weight of the modified resinous composition, and (4) recovering the resulting modified resinous composition.

8. A process for the preparation of a modified resinous composition of matter which imparts improved post-forming characteristics to decorative laminates prepared therefrom which comprises: (1) heating at temperatures ranging from about 40° C. to about 100° C. for from about 30 to 120 minutes a mixture comprising (A) an aminotriazine having at least two amidogen groups, each having at least one aldehyde-reactable hydrogen atom attached to the amidogen nitrogen atom, (B) an aldehyde, the mol ratio of said (B) to said (A) being from about 1.5:1 to about 6:1, respectively, (C) an α-alkyl-D-glucoside and (D) an N-methylol sulfonamide, the total amount of said (C) and said (D) present being from about 1% to about 35% by weight, based on the total weight of the modified resinous composition, to form a resinous syrup, (2) cooling said syrup to at least 60° C., (3) adding an amount of an alkylene polyamine within the range of from about 0.1% to about 1.5% by weight, based on the total weight of the modified composition, and (4) recovering the resulting modified resinous composition.

9. A process for the preparation of a modified resinous composition of matter which imparts improved post-forming characteristics to decorative laminates prepared therefrom which comprises: (1) heating at temperatures ranging from about 40° C. to about 100° C. for from about 30 to 120 minutes a mixture comprising (A) melamine, (B) formaldehyde, the mol ratio of said (B) to said (A) being from about 1.5:1 to about 6:1, respectively, (C) α-methyl-D-glucoside and (D) N-methylol p-toluene sulfonamide, the total amount of said (C) and said (D) present being from about 1% to about 35% by weight, based on the total weight of the modified resinous composition, to form a resinous syrup, (2) cooling said syrup to at least 60° C., (3) adding an amount of 3,3'-iminobispropylamine within the range of from about 0.1% to about 1.5% by weight, based on the total weight of the modified composition, and (4) recovering the resulting modified resinous composition.

References Cited in the file of this patent

UNITED STATES PATENTS

| | | |
|---|---|---|
| 2,769,800 | Suen et al. | Nov. 6, 1956 |
| 2,773,788 | Magrane et al. | Dec. 11, 1956 |
| 2,796,362 | Wooding et al. | June 18, 1957 |